July 17, 1962 R. J. CLAPP ETAL Re. 25,202

PROCESS FOR FORMING OF STRETCHED SHEET MATERIAL

Original Filed Oct. 28, 1955

ROBERT J. CLAPP,
MORTON E. LATHAM,
JOHN G. STAHSBURY,
INVENTORS

BY Lyon & Lyon

ATTORNEYS

United States Patent Office

Re. 25,202
Reissued July 17, 1962

25,202

PROCESS FOR FORMING OF STRETCHED SHEET MATERIAL

Robert J. Clapp, Downey, Calif., Morton E. Latham, Youngstown, Ohio, and John G. Stansbury, La Canada, Calif., assignors to Swedlow Inc., a corporation of California Original No. 2,897,546, dated Aug. 4, 1959, Ser. No. 543,499, Oct. 28, 1955. Application for reissue July 22, 1960, Ser. No. 73,469
10 Claims. (Cl. 18—56)

Matter enclosed in heavy brackets [ ] appears in the original patent but forms no part of this reissue specification; matter printed in italics indicates the additions made by reissue.

This invention relates to the fabrication of plastics in sheet form and has particular reference to a process for forming stretched thermoplastic sheet material.

Recent advances in the production of aircraft glazing materials include the development of stretched monolithic sheet materials made of transparent thermoplastics. These stretched sheets have improved properties of toughness and resistance to crazing and fracturing. By subjecting thermoplastic sheets to linear stretching under certain conditions, the shatter-resistance properties of the sheets are improved, due apparently to the fact that a laminar structure is set up in the sheet. The stretching operation results in a material having shatter-resistant properties similar to that of laminated sheeting such as conventional "safety glass" without suffering the weight penalty of the laminated products. Thus, stretched transparent plastics present a new material which is especially suitable for use in aircraft glazing applications where low weight plays an extremely important part.

Suitable techniques have heretofore been developed for stretching thermoplastic sheeting, either "biaxially," i.e., in two, mutually perpendicular directions, or "multiaxially," i.e., in a plurality of directions extending radially outwardly from the center of the sheet, and in this specification the term "stretched" or similar terms is intended to comprehend either of such types of stretching. However, many problems have arisen in connection with the production of stretched materials formed to the curved contours usually required in aircraft glazing applications. One of the principal objects of this invention is, therefore, to provide a method for forming stretched thermoplastic sheeting into desired curved configurations.

Another object of this invention is to provide a process for forming flat stretched thermoplastic sheeting into both simple and compound curve configurations without significantly degrading the toughness of the sheeting in the as-stretched condition.

Still another object of this invention is to provide a process for contact forming flat stretched thermoplastic sheet material into both simple and compound configurations without mark-off from the die onto the sheet such as to impair the optical properties of the sheet.

Another object of the invention is to provide a forming process for stretched thermoplastic sheet material, which utilizes conventional tooling familiar to those skilled in the art of plastics fabrication.

Other objects and advantages of this invention it is believed will be readily apparent from the following detailed description of preferred embodiments thereof when read in connection with the accompanying drawings.

Figure 1:
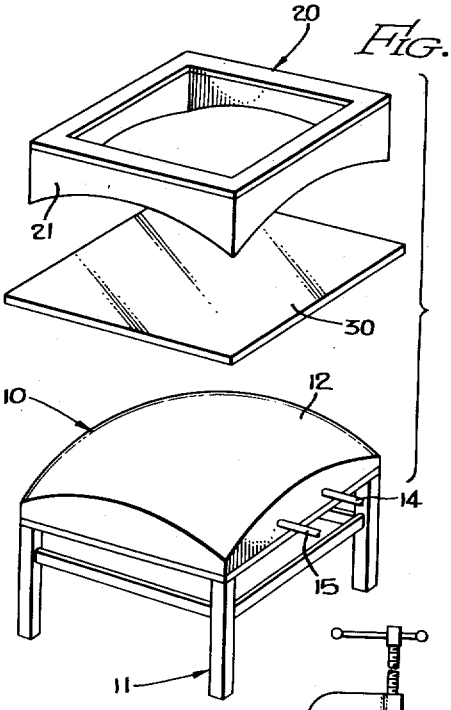
FIGURE 1 is an exploded perspective view illustrating one form of apparatus utilized in carrying out the process of this invention.
Figure 2:
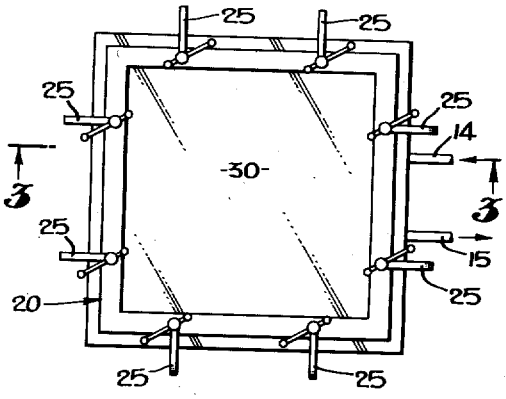
FIGURE 2 is a vertical sectional view of the apparatus of FIGURE 1.

Briefly, this invention includes the discovery that flat stretched thermoplastic sheeting can be formed to simple or compound curved configurations by mechanically forcing the stretched sheet to conform to the desired curved configuration and holding the sheet in this position while heating the sheet to a temperature high enough to relieve the strains imposed by the mechanical forming operation, and preferably closely approaching, but not substantially above, a critical temperature at which substantial shrinkage of the thermoplastic would take place. It has been found that during the stretching operation, residual stresses are set up in the sheet and that if the sheet is warmed to the forming or thermoplastic temperature of the particular thermoplastic material used, the sheet will completely "shrink-back," i.e., return to its original, as-cast dimensions. It has further been found that the relationship between temperature and amount of shrink-back is such that there is a critical temperature, for any given thermoplastic material, at which appreciable shrink-back begins and that, while this temperature is below the normal forming or thermoplastic temperature for that particular material, it is of considerable magnitude, relative to room temperatures. In other words, it has been found that an appreciable degree of heat may be applied to the stretched material before an amount of shrink-back takes place which could be considered to be significant with respect to causing loss of toughness in the stretched sheet. It has been found, also, that superior results are obtained if the temperature of the part be raised, while it is in the restrained, contoured configuration, to a temperature such that a small amount of shrink-back takes place. It is believed that this induced shrink-back of the material plays a part, at least, in "locking" the thermoplastic into the desired curved configuration. This temperature, as indicated above, varies depending upon the particular thermoplastic material being utilized, but it has been found that best results are obtained if the temperature is maintained in a range such as to produce a measurable amount of shrink-back in a flat stretched specimen but no more than about 3 percent shrinkage. By the term "percent shrinkage" and similar terms used herein is meant an amount of lineal shrink-back of a flat specimen heated to the same temperature as the part being formed, based on the dimension of the flat stretched specimen.

Referring now to the drawings, the process of this invention will be described as applied to the production of an aircraft window of compound curve configuration. The apparatus for carrying out the invention may include a more-or-less conventional thin-shell, hollow core phenolic male die 10 supported on a suitable frame 11 and having a forming surface contoured to the desired configuration of the part to be formed. This surface is covered with a sheet of rubberized suede 12. The die is provided with inlet and outlet pipes 14 and 15 for circulation of cooling water into the hollow core 16. Cooperating with the male die is a phenolic ring die or hold-down 20 having a rubberized suede surface 21 which mates with a continuous portion of the male die. A plurality of C-clamps 25 serve to hold the male and female dies together.

Figure 3:
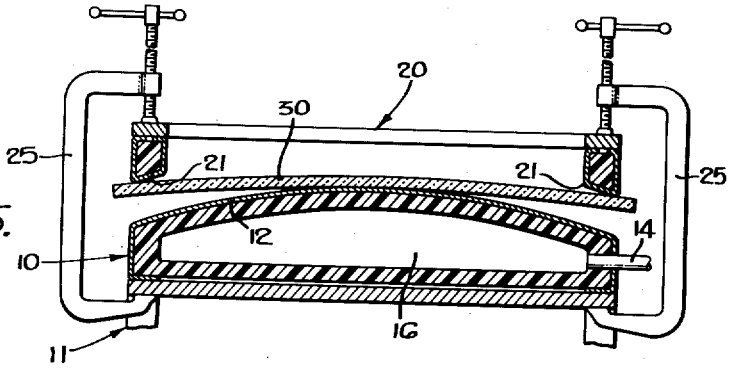
FIGURE 3 is a sectional elevation taken substantially on the line 3—3 of FIGURE 2 and illustrating an initial stage of the process.
Figure 4:
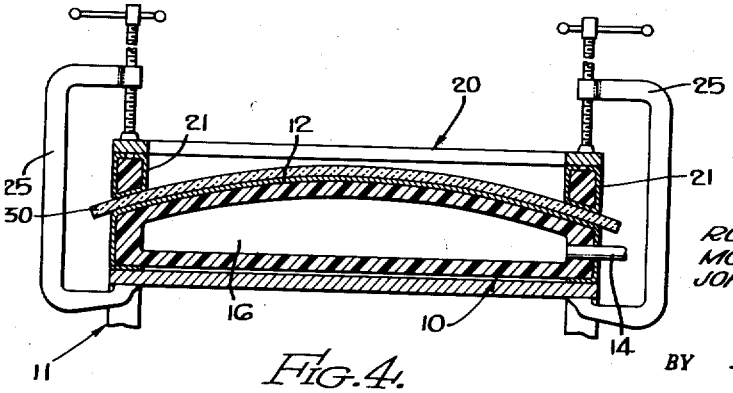
FIGURE 4 is a view similar to FIGURE 3, but illustrating a final stage of the process.

In carrying out the process, the male and female dies are preferably preheated to bring the entire mass thereof up to the desired forming temperature, several hours generally being required to accomplish this. Preferably the flat stretched sheet 30 is also preheated. In some cases it is desirable to preheat the sheet to the forming temperature, but for best results, the sheet should not be maintained in this temperature while in the flat condition for a length of time which would be sufficient to bring about substantial shrinkage. Generally it is sufficient to preheat the flat sheet only for a sufficient length of time to warm the surfaces thereof purely to avoid any surface crazing of the material during the mechanical forming operation. In this case, the body of the plastic sheet remains substantially at room temperature and while at this temperature the sheet is placed between the male and female dies and the C-clamps are partially turned down so as to partially form the sheet, as shown in FIGURE 3. The desired forming temperature is then applied to the assembly for a period of time to at least partially relieve the stresses set up by this degree of deformation of the sheet. Usually about ½ hour is sufficient. Thereupon, if, as is the case with the dies shown, the configuration is not of relatively small radii, the clamps are turned all the way down to force the sheet 30 flush with the die surfaces, as shown in FIGURE 4. The assembly is again subjected to the desired forming temperature and held at this temperature for a sufficient length of time to assure that the entire mass of the sheet is heated uniformly and to assure that all residual stresses set up by the forming are relieved. This time factor varies, depending upon the actual forming temperature, lower temperatures requiring correspondingly longer time periods, and vice versa. The heating period depends also upon the size of the part, the mass of the die, etc., but generally from about 4–20 hours is sufficient.

After the heating period, the die and the part are cooled, by circulation of cooling water, to room temperature, and the clamps are then removed. Usually about 4–8 hours of such cooling is sufficient.

As indicated above, the actual forming temperature varies, depending primarily upon the type of thermoplastic material being operated on. In order to obtain relatively simple contours, the temperature may be quite low—no more than is required to relieve the externally induced stresses set up by the mechanical forming of the sheet. However, the optimum temperature appears to be just at or slightly below the critical temperature at which appreciable shrink-back begins. For example, in the case of stretched cast polymethyl methacrylate such as stretched "Plexiglas" II (Rohm & Haas) or its equivalent, specified as stretched MIL–P–5425A, the optimum forming temperature is about 185° F. The optimum forming temperature for stretched, modified (partially cross-linked) polymethyl methacrylate such as stretched "Plexiglas" 55 (Rohm & Haas) or its equivalent, specified as stretched MIL–P–8184, is 215° F. The preferred forming temperature for stretched polymethyl alpha-chloracrylate such as stretched "Gafite" (General Aniline & Film Corp.) or its equivalent, specified as MIL–P–8427 (USAF tentative), is 245° F. By way of comparison, normal forming temperature for as-cast "Plexiglas" II is above 275° F.; "Plexiglas" 55, above 300° F.; and "Gafite," above 350° F.

In practicing the invention, it is preferred to carry out the entire process, including the clamping operation, in a large oven, although, if desired, a relatively small oven or other heating means may be employed, and the die assembly removed for each clamping operation. For extremely simple contours of large radii, only a single clamping operation need be utilized, but for more sharp contours, it is preferred to bring the part to the ultimate contour in a series of gradual steps so as to avoid overstrain which might result in crazing, fracture or other physical damage. It will be understood by those skilled in the art that other types of apparatus may be used in carrying out the process of this invention such as, for example, a hydraulic ram for the female die, use of both female and male full form dies, hydraulic bag techniques with either a male or female form die, etc. The only requirement is that some means be provided for mechanically bending or forcing the stretched sheet into a configuration and holding it in such configuration while the forming heat is applied thereto, and during the cooling period.

An important feature of the invention, aside from the obviously important result of forming stretched sheets to desired contours without substantial loss in toughness, resides in the fact that acrylic and other thermoplastic materials may be formed to accurate contours by contact forming techniques, yet without obtaining any mark-off from the dies which would impair the optical properties of the finished part. Thus, with the process of this invention, all types of transparent aircraft enclosures, such as canopies, windshelds, windows and the like can be fabricated from stretched thermoplastics.

The following specific examples of the process are illustrative of the invention, but it is to be understood that the invention is not to be limited to the details set forth therein:

EXAMPLE 1

Part No. 84, a sheet of "Plexiglas" 55, 49″ x 49″ x 0.350″ in size, which had been stretched 61.6% in one direction and 60.5% in the other direction, was formed into a compound-curved aircraft window as follows:

A solid male form die and a female ring die were used, and this apparatus was preheated for 14 hours at 170° F. The mold and stretched sheet were then placed in an oven at 215° F. for about 1½ hours. During this preheating period the sheet rested on the male die and the female die rested upon the sheet, in readiness for clamping. After the 1½ hour period, the clamps were applied and the female die brought down a short distance to impart a small degree of change of configuration in the sheet. Thereafter, the clamps were tightened every ½ hour with the final clamping to bring the sheet flush with the die surfaces taking place 4 hours after clamping was begun. All this time the 215° F. temperature was maintained, and the oven and the assembly were maintained at this temperature, with some fluctuation below this temperature, for an additional 12 hours, at which time the heating was discontinued.

Upon discontinuing of the heating, the assembly was covered with a flannel blanket to avoid surface chill, and the oven doors opened. After several hours, the mold temperature had cooled to 110° F. and the clamps were removed. The finished part was found to be formed generally to the desired contour.

The average shrinkage of ten flat specimens taken from the original stretched sheet and exposed to the same temperature cycle was 0.167%. The average dW/dA value (a measure of toughness comprising work per unit area required to propagate a crack, expressed as inch-pounds per square inch) of several specimens of the as-stretched material was 22.6, whereas the dW/dA of the flat specimens subjected to the forming temperature conditions was 24.2. Thus, there was no loss of toughness due to the forming conditions, and, in fact, there was an apparent increase.

EXAMPLE 2

Part No. 90, a sheet of "Plexiglas" 55, 40″ x 48″ x 0.350″, which had been stretched 67.3% in one direction and 62.3% in the other direction was formed in the same mold as used in Example 1 and under the same conditions, except that the clamping operation was completed in 2½ hours, the temperature control was more accurate, and the assembly after heating was cooled to ambient temperature by blowing air under the mold with a squirrel-cage blower for about 72 hours. Upon removal of the clamps, the part was found to be formed within acceptable tolerances.

The average shrinkage of flat specimens exposed to the same forming temperature cycle was 0.584%. The before and after dW/dA values were 30.0 and 23.2. There was some obvious loss in toughness, but this is not significant when it is considered that dW/dA values for the as-cast material is in the neighborhood of 3–5.

EXAMPLE 3

Part No. 88, a sheet of "Plexiglas" 55, 50" x 50" x 0.350", which had been stretched 58.7% in one direction and 65.7% in the other direction was formed to satisfactory contour under substantially the same conditions as set forth in Example 2.

Average shrinkage of the flat specimens was 0.292%. The before and after dW/dA values were 29.8 and 29.5.

EXAMPLE 4

A pair of panels 6" x 8" were taken from part No. 88 prior to forming and these parts were formed lengthwise to a single contour of 7½" inside radius. The die was a hollow metal cylinder but otherwise the forming cycle was the same as Example 3, with the added exception that the assembly was cooled by circulation of cooling water through the interior of the die for about one hour. Upon removal of the clamps, both parts were found to be within 0.030 inch of being flush to the die.

EXAMPLE 5

Part No. 112, a sheet of "Plexiglas" 55, 50" x 50" x 0.350", which had been stretched 67.3% in one direction and 62.3% in the other, was formed with a compound-curved aircraft window as follows:

A thin-shell phenolic die, such as the die 10, and a female ring, such as the ring 20, were preheated for 6 hours at 170° F. and at 215° F. for one hour. The sheet was then placed in the mold, without clamping, and subjected to the 215° F. oven heat for one hour. The clamps were applied and turned down once an hour for two hours. The assembly remained in the oven at 215° F. for an additional 12 hours whereupon it was blanketed, removed from the oven and water cooled for about 8 hours. After this cooling, the clamps were removed and the part was found to be formed to contour.

The average shrinkage of flat specimens was 1.160%. The before and after dW/dA values were 29.6 and 29.8.

While the process of this invention has been described as particularly applied to the forming of acrylics, it will be understood that it is applicable to all thermoplastics which can be stretched, such as, for example, polystyrene.

Having fully described our invention, it is to be understood that we do not wish to be limited to the details set forth, but our invention is of the full scope of the appended claims.

We claim:

1. A process for forming flat stretched thermoplastic sheet material of tough laminar structure into curved contours without substantial decrease in toughness and resistance to crazing and fracturing of such material, comprising the steps of mechanically forming the sheet at a temperature below the thermoplastic temperature of said material to a curved contour while imparting stresses therein, holding the sheet to said contour while heating the same to a temperature sufficiently high and for a sufficient length of time to impart a *small amount of shrink-back to the sheet, said shrink-back corresponding to a* measurable amount of shrinkage in a flat specimen of said stretched sheet subjected to the same temperature conditions as said contoured sheet, but below the temperature at which more than about 3 percent shrinkage of said flat specimen occurs, and cooling said sheet while continuing to hold the sheet to said contour.

2. A process for forming flat stretched acrylic sheet material of tough laminar structure into curved contours without substantial decrease in toughness and resistance to crazing and fracturing of such material, comprising the steps of mechanically forming the sheet at a temperature below the thermoplastic temperature of such sheet material to a curved contour while imparting stresses therein, holding the sheet to said contour while heating the same to a temperature sufficiently high and for a sufficient length of time to impart a *small amount of shrink-back to the sheet, said shrink-back corresponding to a* measurable amount of shrinkage in a flat specimen of said stretched sheet subjected to the same temperature conditions as said contoured sheet, but below the temperature at which more than about 3 percent shrinkage of said flat specimen occurs, and cooling said sheet while continuing to hold the sheet to said contour.

3. A process for forming flat stretched polymethyl methacrylate sheet material of tough laminar structure into curved contours without substantial decrease in the toughness and resistance to crazing and fracturing of such material, comprising the steps of mechanically forming the sheet at a temperature below the thermoplastic temperature of such sheet material to a curved contour while imparting stresses therein, holding the sheet to said contour while heating the same to a temperature of about 185° F. for a sufficient length of time to set the sheet in the curved contour, and to impart a *small amount of shrink-back to the sheet, said shrink-back corresponding to a* measurable amount of shrinkage, but not more than about 3%, in a flat specimen of said stretched sheet subjected to the same temperature conditions as said contoured sheet and cooling said sheet while continuing to hold the sheet to said contour.

4. A process for forming flat stretched, cross-linked polymethyl methacrylate sheet material of tough laminar structure into curved contours without substantial decrease in the toughness and resistance to crazing and fracturing of such material, comprising the steps of deforming the sheet material at a temperature below the thermoplastic temperature of such sheet material and to a curved contour while imparting stresses therein, holding the sheet to said contour while heating the same to a temperature of about 215° F. for a sufficient length of time to set the sheet in the curved contour, and to impart a *small amount of shrink-back to the sheet, said shrink-back corresponding to a* measurable amount of shrinkage, but not more than about 3%, in a flat specimen of said stretched sheet subjected to the same temperature conditions as said contoured sheet and cooling said sheet while continuing to hold the sheet to said contour.

5. A process for forming flat stretched polymethyl alpha-chloracrylate sheet material of tough laminar structure into curved contours without substantial decrease in the toughness and resistance to crazing and fracturing of such material, comprising the steps of mechanically forming the sheet at a temperature below the thermoplastic temperature of such sheet material to a curved contour while imparting stresses therein, holding the sheet to said contour while heating the same to a temperature of about 245° F. for a sufficient length of time to set the sheet in the curved contour, and to impart a *small amount of shrink-back to the sheet, said shrink-back corresponding to a* measurable amount of shrinkage, but not more than about 3%, in a flat specimen of said stretched sheet subjected to the same temperature conditions as said contoured sheet and cooling said sheet while continuing to hold the sheet to said contour.

6. A process for forming flat stretched thermoplastic sheet material of tough laminar structure into curved contours without substantial decrease in the toughness and resistance to crazing and fracturing of such material, comprising the steps of mechanically forming the sheet to a curved contour while at least the main body of the sheet is maintained at approximately normal room temperature, and holding the sheet to said contour while heating the same to a temperature sufficiently high and for a sufficient length of time to impart a *small amount of shrink-back to the sheet, said shrink-back corresponding to a* measurable amount of shrinkage in a flat specimen of said stretched sheet subjected to the same temperature conditions as said contoured sheet, but below the temperature at which more than about 3 percent shrinkage of said flat specimen occurs.

7. A process for forming flat stretched acrylic sheet material of tough laminar structure into curved contours without substantial decrease in the toughness and resistance to crazing and fracturing of such material, comprising the steps of mechanically forming the sheet to a curved contour while at least the main body of the sheet is maintained at approximately normal room temperature, holding the sheet to said contour while heating the same to a temperature sufficiently high and for a sufficient length of time to impart a *small amount of shrink-back to the sheet, said shrink-back corresponding to a* measurable amount of shrinkage in a flat specimen of said stretched sheet subjected to the same temperature conditions as said contoured sheet, but below the temperature at which more than about 3 percent shrinkage of said flat specimen occurs.

*8. A process for forming flat stretched thermoplastic sheet material of tough laminar structure into curved contours without substantial decrease in toughness and resistance to crazing and fracturing of such material, comprising the steps of mechanically forming the sheet into contact with a die at a temperature below the thermoplastic temperature of said material to a curved contour while imparting stresses therein, holding the sheet to said contour and shrinking the sheet in contact with the die by heating the sheet to a temperature sufficiently*

*high and for a sufficient length of time to produce said shrinkage, and cooling said sheet while continuing to hold the sheet to said contour.*

*9. The process of claim 8 wherein the sheet material is polymethyl methacrylate.*

*10. The process of claim 8 wherein the mechanical forming step is carried out while at least the main body of the sheet is maintained at approximately normal room temperature.*

References Cited in the file of this patent or the original patent

UNITED STATES PATENTS

| | | |
|---|---|---|
| 2,330,837 | Mullen | Oct. 5, 1943 |
| 2,370,827 | Weichbrodt et al. | Mar. 6, 1945 |
| 2,444,420 | Borkland | July 6, 1948 |
| 2,493,439 | Braund | Jan. 3, 1950 |
| 2,659,105 | Halbig | Nov. 17, 1953 |
| 2,688,772 | Sandorff | Sept. 14, 1954 |
| 2,759,217 | Peterson | Aug. 21, 1956 |

OTHER REFERENCES

"Styrene, Its Polymers, Copolymers and Derivatives" (Boundy-Boyer), published by Reinhold Publishing Corp., New York, 1952, pages 600–606, 1158–1161. (Copy in Scientific Library.)